United States Patent
Lin et al.

(10) Patent No.: US 7,194,243 B2
(45) Date of Patent: Mar. 20, 2007

(54) DC OFFSET AND 1/F NOISE COMPENSATION OF A DIRECT CONVERSION RECEIVER

(75) Inventors: Hung C. Lin, Silver Spring, MD (US); Weixin Kong, Germantown, MD (US)

(73) Assignee: Maryland Semiconductor Inc., Clarksburg, MD (US)

( * ) Notice: Subject to any disclaimer, the term of this patent is extended or adjusted under 35 U.S.C. 154(b) by 398 days.

(21) Appl. No.: 10/816,087

(22) Filed: Apr. 2, 2004

(65) Prior Publication Data

US 2005/0221781 A1 Oct. 6, 2005

(51) Int. Cl.
*H04B 1/06* (2006.01)

(52) U.S. Cl. .................... 455/232.1; 455/234.1; 455/226.1; 455/245.1; 327/307

(58) Field of Classification Search .............. 455/324, 455/226.1, 226.2, 67.11, 67.12, 232.1, 234.1, 455/250.1, 245.1, 253.2, 127.1; 327/307, 327/362, 537
See application file for complete search history.

(56) References Cited

U.S. PATENT DOCUMENTS

| | | | |
|---|---|---|---|
| 4,034,233 A * | 7/1977 | Leyde | 455/234.1 |
| 4,658,096 A | 4/1987 | West, Jr. et al. | |
| 4,734,928 A | 3/1988 | Weiner et al. | |
| 4,737,975 A | 4/1988 | Shafer | |
| 4,775,997 A | 10/1988 | West, Jr. et al. | |
| 4,922,517 A | 5/1990 | West, Jr. et al. | |
| 5,020,091 A | 5/1991 | Krolopp et al. | |
| 5,185,779 A | 2/1993 | Dop et al. | |
| 5,397,944 A * | 3/1995 | DuPuis | 327/307 |
| 5,530,736 A | 6/1996 | Comer et al. | |
| 5,546,444 A | 8/1996 | Roach, Jr. et al. | |
| 5,751,789 A | 5/1998 | Farris et al. | |
| 5,757,219 A * | 5/1998 | Weedon et al. | 327/307 |
| 5,907,238 A * | 5/1999 | Owerko et al. | 455/127.1 |
| 6,072,858 A | 6/2000 | Bellin | |
| 6,134,314 A | 10/2000 | Dougherty et al. | |
| 6,735,422 B1 * | 5/2004 | Baldwin et al. | 455/232.1 |
| 6,909,882 B2 * | 6/2005 | Hayashi et al. | 455/84 |
| 6,917,534 B2 * | 7/2005 | Baker | 455/232.1 |
| 7,039,016 B1 * | 5/2006 | Lindskog et al. | 455/67.11 |
| 2003/0176174 A1 * | 9/2003 | Seppinen et al. | 455/226.1 |
| 2005/0118980 A1 * | 6/2005 | Pai et al. | 455/340 |

* cited by examiner

*Primary Examiner*—Lana Le
(74) *Attorney, Agent, or Firm*—H.C. Lin Patent Agent

(57) ABSTRACT

In a direct conversion receiver with zero-frequency intermediate frequency (IF) signal, the DC offset and 1/f noise of the IF signal is compensated by means of double-sampling. The first period of the doubling-sampling is a calibration phase, which stores the DC offset and the 1/f noise. The second period is a signal flow phase during which the stored DC offset and 1/f noise is connected in opposition with the IF signal to cancel the DC offset and 1/f noise.

2 Claims, 4 Drawing Sheets

(a)

(b)

(c)

DC OFFSET AND 1/F NOISE COMPENSATION OF A DIRECT CONVERSION RECEIVER

BACKGROUND OF THE INVENTION

1. Field of the Invention

This invention relates to a radio receiver, in particular to a direct conversion receiver with zero intermediate frequency.

2. Brief Description of Related Art

In recent years, the direct conversion radio receiver has gained a great deal of interest. In such a receiver, the incoming signal is mixed with a local oscillator of the same frequency, and the beat frequency intermediate frequency (IF) signal has zero frequency (i.e. a DC signal). There is no image to reject and there is no need for a front-end image reject filter. Nor is there any need for an external filter such as a surface acoustic wave (SAW) filter for the IF signal.

However, there are several drawbacks to direct conversion. Among these problems is sensitivity to DC offsets (both internal as well as externally induced) and 1/f noise: With zero IF, the DC offsets and 1/f noise represent error components within the same band as the desired signal.

Many attempts have been made to overcome these problems. [1, 2]. Most of these solutions use some negative feedback schemes, which are complicated, sensitive to instability, and may not solve both the DC offset and 1/f problem together.

SUMMARY OF THE INVENTION

An object of the present invention is to compensate for the DC offset problem in a direct conversion receiver. Another object is to minimize the 1/f noise in a direct conversion receiver. Still another object of the present invention is to overcome the DC offset problem and the 1/f problem simultaneously.

These objects are achieved by means of double sampling. During the first sampling period, the DC offset and 1/f noise signal are sampled as a compensation signal without any RF signal input and stored in a capacitor. During the second sampling period, the RF signal is applied and the stored DC offset and 1/f noise signal is connected in opposite phase in series with the RF signal, thus canceling the stored DC offset and the 1/f noise.

DETAILED DESCRIPTION OF THE INVENTION

Figure 1:
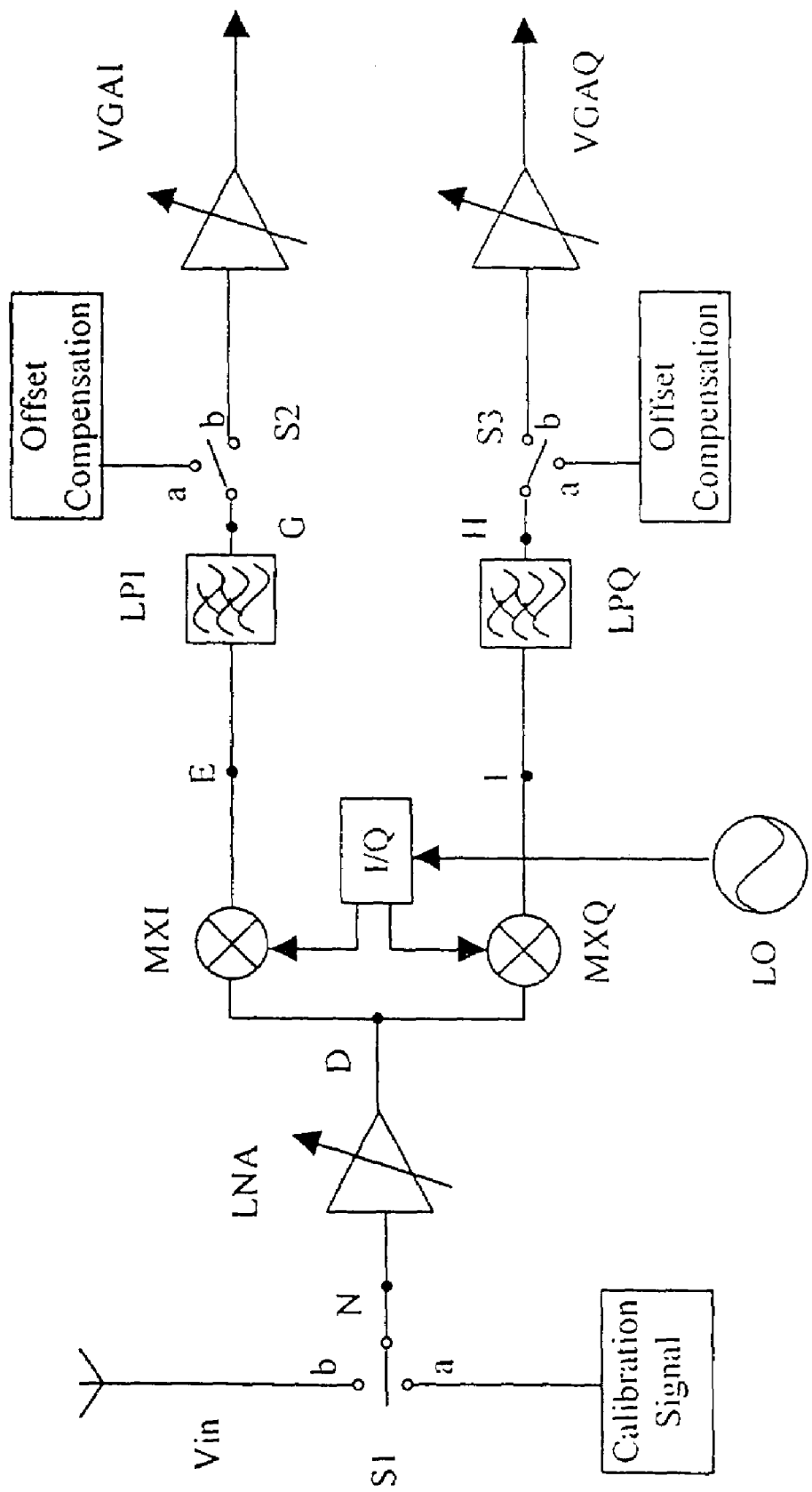
FIG. 1 shows the basic block diagram of the present invention using double sampling technique for DC offset and 1/f noise compensation in direct conversion receiver.

FIG. 1 shows the basic block diagram of the present invention as applied to a direct conversion receiver. Normally the receiver operates the single-pole, double-throw (SPDT) switches S1, S2, S3 in position "b". The incoming signal Vin is amplified by a low-noise amplifier LNA. The amplifier signal from the LNA is mixed with a local oscillator (LO) with the same frequency as the incoming signal Vin. The local oscillator generates an in-phase component I and a quadrature component Q. The I component and the Q component beat with the amplified incoming signal from the LNA in the mixers MXI and MXQ respectively to produce two zero frequency (i.e. DC) IF signals. The signal from MXI is filtered by a low-pass filter LPI, and the signal from MXQ is filtered by low-pass filter LPQ to eliminate any double frequency image signals. The filtered signals LPI and LPQ are then amplified by amplifiers VGAI and VGAQ respectively before demodulation. Since VGAI and VGAQ are DC amplifiers, the DC offset voltage and 1/f noise pose serious problems.

Such DC offset voltage and 1/f noise are compensated by double-sampling in FIG. 1. The amplifiers are first calibrated during phase "a" with the SPDT switches S1, S2 and S3 switched to position "a". During phase "a", the DC offset voltage and the 1/f noise required for compensation is measured and stored in the compensation blocks, "Offset compensation". During phase "b" with the switches S1, S2 and S3 in position "b", the stored DC offset voltage and the 1/f noise during phase "a" are applied in opposite direction to compensate for the DC offset voltage and 1/f noise voltage when the switches are in position "b".

Figure 2:
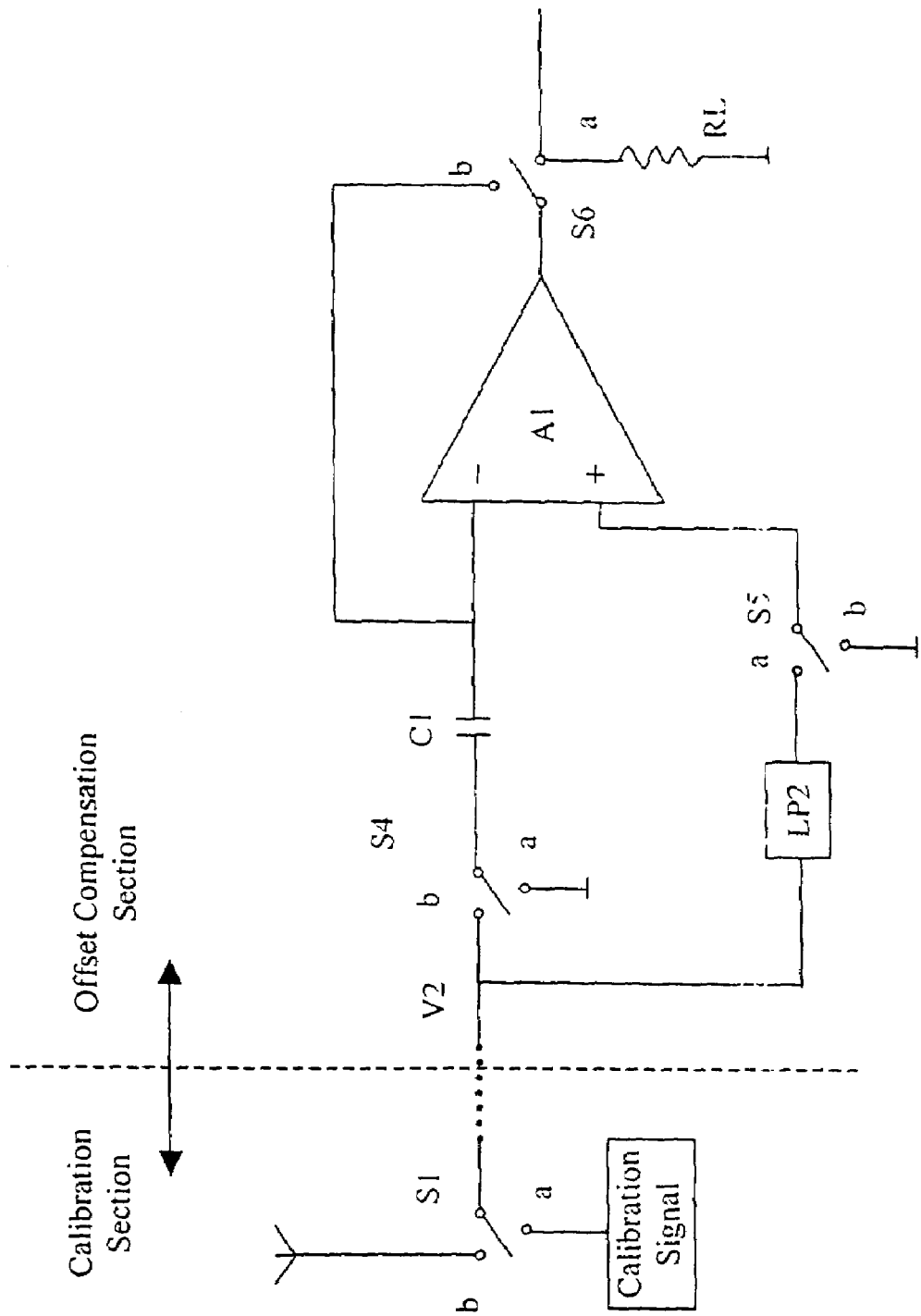
FIG. 2 shows the basic circuit for implementing the doubling sampling compensation of DC offset and 1/f noise.

FIG. 2 shows the basic compensation circuit for storing the compensation voltages. A double-sampled signal V2 is applied to the input of this compensation circuit. V2 contains a calibration signal which is applied during the calibration phase corresponding to position "a" of all the SPDT switches S4, S5 and S6 and a signal-flow phase corresponding to position "b" of all the switches. The amplifier A1 corresponds to either VGAI or VGAQ in FIG. 1 and is an operational amplifier. The inverting input terminal is short-circuited to the output through a SPDT S6 in position "a" during the calibration phase, and is connected through capacitor C1, which is grounded through S4. Meanwhile, V2 is applied to the non-inverting terminal of the operational amplifier through a low-pass filter LP2 and switch S5. In this connection, any DC offset voltage and 1/f noise signal in V2 appears at the non-inverting terminal of A1, which, in turn, appears at the inverting terminal due to virtual ground. Thus the capacitor C1 is charged up to the DC offset voltage plus the 1/f noise voltage. During the signal phase of V2 corresponding position "b" of all the switches, the signal in V2 is applied through C1 to the inverting terminal of A1, which now operates normally. Since the stored DC offset voltage plus the 1/f noise voltage stored in C1 opposes the DC offset voltage in V2, the DC offset voltage and 1/f noise voltage are canceled, and not amplified by A1.

Figure 3:
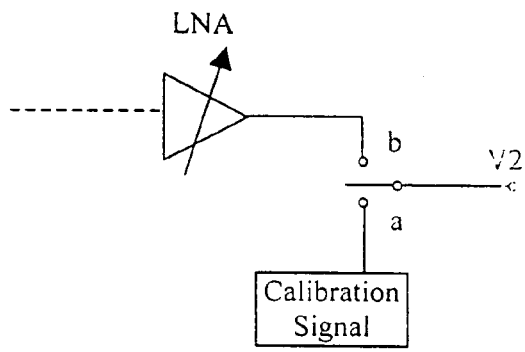
FIG. 3a shows a calibration signal applied after the low noise amplifier.
FIG. 3b shows a calibration signal applied after the mixers.
FIG. 3(c) shows a calibration signal applied after the low-pass filter.
Figure 3:
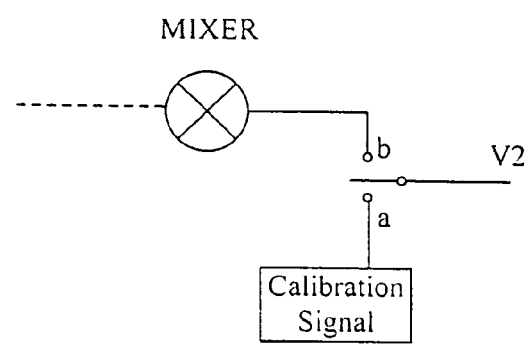
Figure 3:
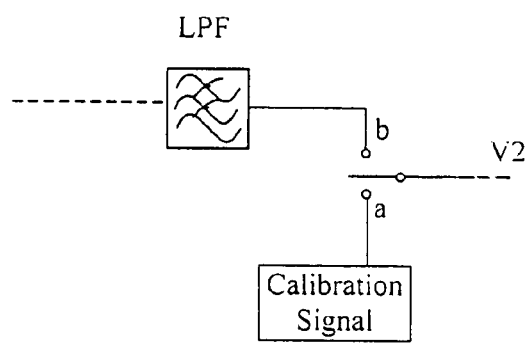

The compensation circuit can be applied at any point before the zero IF amplifiers. FIG. 1 shows the application of the compensation circuit at node N before the LNA amplifier. The compensation circuit can also be applied to node D after the LNA amplifier as shown in FIG. 3(a), after the mixers MXI, MXQ at nodes E, F as shown in FIG. 3(b), or after the low-pass filters LPI, LPQ at nodes G,H as shown in FIG. 3(c).

Figure 4:
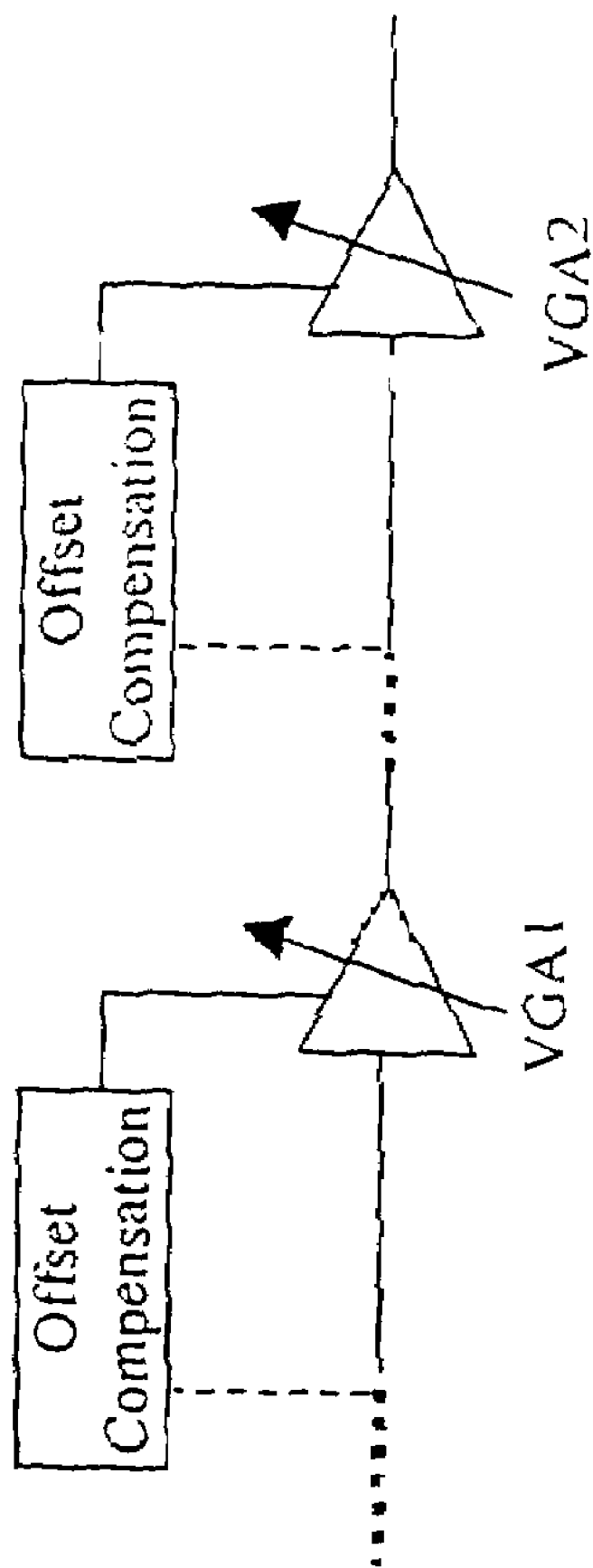
FIG. 4 shows the application of double sampling compensation to multiple number of stages of the zero intermediate frequency (IF) amplifier.

FIG. 1 is shown for a single stage of the IF amplifier VGAI and VGAQ. If the IF amplifier has more than one stage, the compensation can be applied to the last stage or individually to every stage. For application to more than one stage individually such as VGA1, VGA2 using SPDT switches such as S21, S22, etc., the compensation circuit FIG. 3(c) can be repeated as shown in FIG. 4.

The calibration signal can be of DC or an RF signal to simulate a regular situation, or any other AC signal. When a DC calibration signal is used, the low pass filter LP shown in FIG. 1 need not be used.

The use double sampling may incur charge injection and parasitic capacitance problems. Such problems have been known and solved by those skilled in the art, and not elaborated.

While the preferred embodiments of the invention have been described, it will be obvious to those skilled in the art that various modifications may be made to the invention without departing from the spirit of the present invention. Such modifications are all within the scope of the present invention.

The invention claimed is:

1. A DC offset compensation system for a direct conversion receiver, comprising:
    an incoming radio frequency signal;
    a local oscillator (LO) generating a local oscillator signal with a frequency equal to that of said incoming frequency signal;
    at least one mixer to mix said radio frequency signal with said local oscillator signal to generate to zero frequency intermediate frequency (IF) signal;
    a double sampling means having a calibration phase and a signal flow phase, wherein a compensation signal is generated and stored during the calibration phase; and said IF signal is processed during the signal flow Phase;
    means to generate and store any DC offset of said IF signal to cancel the DC offset of said IF signal during the signal flow phase, and
    means to insert said compensating signal in said IF signal to cancel the DC offset of said IF signal during the signal flow phase,
    wherein said compensation signal is generated by applying a calibration signal to derive said compensating signal and storing said compensating signal across a capacitor,
    wherein said compensating signal is derived by applying said calibrating signal to the non-inverting input terminal of an operational amplifier, short-circuiting the output of said operational amplifier to the inverting terminal of said operational amplifier to derive said compensating signal at the inverting terminal of said operational amplifier, and
    wherein said compensating signal is stored in a capacitor with first electrode connected to said inverting terminal and second electrode of capacitor connected to ground.

2. The DC offset compensation system as described in claim 1, wherein said operational amplifier constitutes one stage of an IF amplifier to amplify said IF signal.

* * * * *